US012020607B2

(12) United States Patent
Kim et al.

(10) Patent No.: US 12,020,607 B2
(45) Date of Patent: Jun. 25, 2024

(54) DISPLAY APPARATUS AND METHOD OF DRIVING THE SAME

(71) Applicant: Samsung Display Co., Ltd., Yongin-Si (KR)

(72) Inventors: Jongbin Kim, Seongnam-si (KR); Seungho Park, Suwon-si (KR); Boyoung An, Hwaseong-si (KR); Wook Lee, Hwaseong-si (KR); Ji-Woong Jeong, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/125,622

(22) Filed: Mar. 23, 2023

(65) Prior Publication Data

US 2023/0419870 A1 Dec. 28, 2023

(30) Foreign Application Priority Data

Jun. 22, 2022 (KR) ........................ 10-2022-0076267

(51) Int. Cl.
*G09G 3/00* (2006.01)
*G09G 3/20* (2006.01)
*G09G 3/3233* (2016.01)

(52) U.S. Cl.
CPC ........... *G09G 3/006* (2013.01); *G09G 3/2096* (2013.01); *G09G 3/3233* (2013.01); *G09G 2300/0842* (2013.01); *G09G 2310/0202* (2013.01); *G09G 2320/041* (2013.01); *G09G 2330/028* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 10,762,813 B2 * | 9/2020 | Yuan | .................... | G09G 3/3258 |
| 2018/0254013 A1 * | 9/2018 | Xu | ........................ | G09G 3/3648 |

FOREIGN PATENT DOCUMENTS

| | | | | |
|---|---|---|---|---|
| CN | 107424559 A | * 12/2017 | ........... | G09G 3/3208 |
| CN | 109961728 A | * 7/2019 | ............. | G09G 3/006 |
| CN | 110853559 A | * 2/2020 | ............. | G09G 3/006 |
| CN | 107516483 B | * 6/2020 | ............. | G09G 3/006 |
| CN | 112201198 A | * 1/2021 | ............... | G09G 3/32 |
| CN | 113777030 A | * 12/2021 | | |
| CN | 110853559 B | * 2/2023 | ............. | G09G 3/006 |
| KR | 10-2014-0041968 A | 4/2014 | | |

(Continued)

*Primary Examiner* — Duane N Taylor, Jr.
(74) *Attorney, Agent, or Firm* — Innovation Counsel LLP

(57) ABSTRACT

A display apparatus includes a display panel including pixels, a gate driver outputting gate signals to the pixels, a data driver outputting data voltages to the pixels, a sensing circuit receiving sensed signals from the pixels, a power voltage generator applying a power voltage, and a driving controller for stopping the display panel, the gate driver, the data driver, and/or the power voltage generator when the display panel is determined to be defective. The driving controller selects a first-mode threshold set or a second-mode threshold set based on an initial value set related to the sensed signals for determining whether the display panel is defective. Thresholds in the first-mode threshold set respectively correspond to and are respectively unequal to thresholds in the second-mode threshold set.

27 Claims, 9 Drawing Sheets

(56) References Cited

FOREIGN PATENT DOCUMENTS

| | | | |
|---|---|---|---|
| KR | 10-2017-0088005 | A | 8/2017 |
| KR | 10-2018-0013263 | A | 2/2018 |
| KR | 10-2239898 | B1 | 4/2021 |

* cited by examiner

DISPLAY APPARATUS AND METHOD OF DRIVING THE SAME

CROSS-REFERENCE TO RELATED APPLICATION

This application claims priority under 35 U.S.C. § 119 to Korean Patent Application No. 10-2022-0076267, filed on Jun. 22, 2022 in the Korean Intellectual Property Office (KIPO); the Korean Patent Application is incorporated by reference.

BACKGROUND

1. Field

The technical field is related to a display apparatus and a method of driving the display apparatus.

2. Description of the Related Art

Generally, a display apparatus includes a display panel and a display panel driver. The display panel includes a plurality of gate lines, a plurality of data lines and a plurality of pixels. The display panel driver includes a gate driver and a data driver. The gate driver outputs gate signals to the gate lines. The data driver outputs data voltages to the data lines. The display panel driver further includes a sensing circuit receiving sensed signals from the pixels.

In a writing mode, the data driver may output a data voltage to the display panel. In a sensing mode, the data driver may output a sensing data voltage to the display panel. In the sensing mode, the sensing circuit may sense an electrical characteristic of a switching element of a pixel by sensing a current of the pixel.

When one or more internal wires of the display panel are shorted (e.g., due to an abnormal operation or a crack of the display panel) a fire may occur due to an overcurrent. To prevent an accident, panel defects need to be detected based on sensed electrical characteristics of the pixels of the display panel.

In a high temperature environment, values of sensed signals may be relatively high and may unexpectedly exceed a normal reference value. As a result, a display panel may be erroneously deemed defective even if the display panel is not defective.

SUMMARY

Embodiments may be related to a display apparatus that may prevent incorrect defect detection possibly caused by a change of the temperature of the display panel of the display apparatus.

Embodiments may be related to a method of operating the display apparatus.

The display apparatus may include a display panel including a pixel, a gate driver configured to output a gate signal to the pixel, a data driver configured to output a data voltage to the pixel, a sensing circuit configured to receive a sensed signal from the pixel, a power voltage generator configured to apply a power voltage to at least one of the display panel, the gate driver and the data driver and a driving controller configured to stop an operation of at least one of the display panel, the gate driver, the data driver and the power voltage generator when the display panel is determined as a defective panel. The driving controller is configured to determine a first mode and a second mode based on an initial sensed value and to set at least one of a first threshold value, a second threshold value and a third threshold value for determining the defective panel differently for the first mode and the second mode.

The initial sensed value may include sensed values of the pixels corresponding to N gate lines. N may be less than a total number of the gate lines of the display panel. N may be an integer equal to or greater than two.

The initial sensed value may include sensed values of the pixels corresponding to total gate lines of the display panel.

The initial sensed value may include sensed values of the pixels corresponding to N gate lines. The driving controller may be configured to compare an average of the sensed values of the pixels to a mode threshold value. When the average is equal to or greater than the mode threshold value, the driving controller may be configured to operate in the first mode. When the average is less than the mode threshold value, the driving controller may be configured to operate in the second mode. N is an integer equal to or greater than two.

When a difference between a present cycle sensed value of the pixel and a previous cycle sensed value of the pixel is equal to or greater than the first threshold value, the driving controller may be configured to determine the pixel as a defective pixel candidate.

The first threshold value of the first mode may be different from the first threshold value of the second mode. The first threshold value of the first mode may be greater than the first threshold value of the second mode.

When the present cycle sensed value of the defective pixel candidate is equal to or greater than the second threshold value, the driving controller may be configured to determine the defective pixel candidate as a defective pixel.

The second threshold value of the first mode may be different from the second threshold value of the second mode. The second threshold value of the first mode may be greater than the second threshold value of the second mode.

When a number of the defective pixels is equal to or greater than the third threshold value, the driving controller may be configured to determine the display panel as the defective panel.

The third threshold value of the first mode may be different from the third threshold value of the second mode. The third threshold value of the first mode may be less than the third threshold value of the second mode.

The third threshold value of the first mode may be substantially the same as the third threshold value of the second mode.

The driving controller may be configured to receive a defective flag representing whether the display panel has a history determined as the defective panel. When the display panel does not have the history determined as the defective panel, the driving controller may be configured to operate in one of the first mode and the second mode. When the display panel has the history determined as the defective panel, the driving controller may be configured to operate in a third mode.

The defective panel may be determined using the second threshold value and the third threshold value in the third mode. When a present cycle sensed value of the pixel is equal to or greater than the second threshold value of the third mode, the driving controller may be configured to determine the pixel as the defective pixel.

When a number of the defective pixels is equal to or greater than the third threshold value of the third mode, the driving controller may be configured to determine the display panel as the defective panel.

The second threshold value of the third mode may be greater than the second threshold value of the second mode.

The second threshold value of the third mode may be substantially the same as the second threshold value of the first mode.

The second threshold value of the third mode may be greater than the second threshold value of the first mode.

The third threshold value of the third mode may be substantially the same as the third threshold value of the first mode.

The third threshold value of the third mode may be less than the third threshold value of the first mode.

The driving controller may be configured to sense a sensed value of a pixel corresponding to total gate lines of the display panel in the third mode. The driving controller may be configured to determine whether the display panel is the defective panel based on the sensed value of the pixel corresponding to the total gate lines.

The driving controller may be configured to sense a sensed value of a pixel corresponding to M gate lines of the display panel in the third mode. The driving controller may be configured to determine whether the display panel is the defective panel based on the sensed value of the pixel corresponding to the M gate lines. M may be an integer equal to or greater than two.

In an embodiment of a method of driving a display apparatus, the method includes receiving a sensed signal from a pixel of a display panel, determining a first mode and a second mode based on an initial sensed value, setting at least one of a first threshold value, a second threshold value and a third threshold value for determining a defective panel differently for the first mode and the second mode, determining whether the display panel is the defective panel in the first mode and the second mode and stopping an operation of at least one of the display panel, a gate driver, a data driver and a power voltage generator when the display panel is determined as the defective panel.

The initial sensed value may include sensed values of the pixels corresponding to N gate lines. The determining the first mode and the second mode may include comparing an average of the sensed values of the pixels to a mode threshold value, operating a driving controller in the first mode when the average is equal to or greater than the mode threshold value and operating the driving controller in the second mode when the average is less than the mode threshold value. N may be an integer equal to or greater than two.

The determining whether the display panel is the defective panel may include, when a difference between a present cycle sensed value of the pixel and a previous cycle sensed value of the pixel is equal to or greater than the first threshold value, determining the pixel as a defective pixel candidate.

The determining whether the display panel is the defective panel may further include, when the present cycle sensed value of the defective pixel candidate is equal to or greater than the second threshold value, determining the defective pixel candidate as a defective pixel.

When a number of the defective pixels is equal to or greater than the third threshold value, the display panel may be determined as the defective panel.

The method may further include determining whether the display panel has a history determined as the defective panel. When the display panel does not have the history determined as the defective panel, a driving controller may be configured to operate in one of the first mode and the second mode. When the display panel has the history determined as the defective panel, the driving controller may be configured to operate in a third mode.

An embodiment may be related to a display apparatus. The display apparatus may include a display panel including pixels, a gate driver configured to output gate signals to the pixels, a data driver configured to output data voltages to the pixels, a sensing circuit configured to receive sensed signals from the pixels, a power voltage generator configured to apply a power voltage (to at least one of the display panel, the gate driver, and the data driver), and a driving controller configured to stop an operation of at least one of the display panel, the gate driver, the data driver, and the power voltage generator when the display panel is determined to be defective. The driving controller may select one of a first-mode threshold set and a second-mode threshold set based on an initial sensed signal value set related to the sensed signals for determining whether the display panel is defective. The first-mode threshold set may include a first-mode first threshold, a first-mode second threshold, and a first-mode third threshold. The second-mode threshold set may include a second-mode first threshold, a second-mode second threshold, and a second-mode third threshold respectively corresponding to and respectively unequal to the first-mode first threshold, the first-mode second threshold, and the first-mode third threshold.

The initial sensed signal value set may be values of sensed signals corresponding to a subset the pixels. The subset of the pixels may be electrically connected to a subset of gate lines of the display apparatus.

The initial sensed signal value set may be values corresponding to all the pixels of the display panel.

The initial sensed signal value set may be values of sensed signals corresponding to a subset of the pixels. The driving controller may compare an average of the values of the sensed signals corresponding to the subset of the pixels with a mode threshold. When the average is equal to or greater than the mode threshold, the driving controller selects the first-mode threshold set, so that a first threshold value, a second threshold value, and a third threshold value are equal to the first-mode first threshold, the first-mode second threshold, and the first-mode third threshold, respectively. When the average is less than the mode threshold, the driving controller selects the second-mode threshold set, so that the first threshold value, the second threshold value, and the third threshold value are equal to the second-mode first threshold, the second-mode second threshold, and the second-mode third threshold, respectively.

When a difference between a present cycle sensed signal value of a pixel among the pixels and a previous cycle sensed signal value of the pixel is equal to or greater than the first threshold value, the driving controller may determine the pixel to be a defective pixel candidate.

The first-mode first threshold may be greater than the second-mode first threshold.

When a present cycle sensed signal value of the defective pixel candidate is equal to or greater than the second threshold value, the driving controller may determine the defective pixel candidate to be a defective pixel.

The first-mode second threshold may be greater than the second-mode second threshold.

When a number of defective pixels of the display panel determined by the driving controller is equal to or greater than the third threshold value, the driving controller may determine the display panel to be defective.

The first-mode third threshold may be less than the second-mode third threshold.

The first-mode third threshold may be equal to the second-mode third threshold.

The driving controller may receive a flag representing (or indicating) whether the display panel has a history of being determined to be defective (and/or a history of a panel protection operation). When the flag indicates that the display panel does not have a history of being determined to be defective (and/or a history of a panel protection operation), the driving controller may use the first-mode threshold set or the second-mode threshold set to determine whether the display panel is defective. When the flag indicates that the display panel has a history of being determined to be defective (and/or a history of a panel protection operation), the driving controller may use a third-mode threshold set to determine whether the display panel is defective.

The third-mode threshold set may include no third-mode first threshold corresponding to the second-mode first threshold and may include a third-mode second threshold and a third-mode third threshold respectively corresponding to and respectively unequal to the second-mode second threshold and the second-mode third threshold. When a present cycle sensed signal value of a pixel among the pixels is equal to or greater than the third-mode second threshold, the driving controller may determine the pixel to be a defective pixel.

When a number of defective pixels of the display panel determined by the driving controller is equal to or greater than the third-mode third threshold value, the driving controller may determine the display panel to be defective.

The third-mode second threshold may be greater than the second-mode second threshold.

The third-mode second threshold may be equal to the first-mode second threshold.

The third-mode second threshold may be greater than the first-mode second threshold.

The third-mode third threshold may be equal to the first-mode third threshold.

The third-mode third threshold may be less than the first-mode third threshold.

The driving controller may determine whether the display panel is defective based on values corresponding to sensed signals of all of the pixels of the display panel when the flag indicates that the display panel has a history of being determined to be defective (and/or a history of a panel protection operation).

The driving controller may determine whether the display panel is defective based on values corresponding to sensed signals of a subset of the pixels of the display panel when the flag indicates that the display panel has a history of being determined to be defective (and/or a history of a panel protection operation).

An embodiment may be related to a method of operating a display apparatus. The display apparatus may include a display panel, a gate driver, a data driver, and a power voltage generator. The method may include the following steps: receiving sensed signals from pixels of the display panel; and selecting one of a first-mode threshold set and a second-mode threshold set based on an initial sensed signal value set related to the sensed signals. The first-mode threshold set may include a first-mode first threshold value, a first-mode second threshold value, and a first-mode third threshold value. The second-mode threshold set may include a second-mode first threshold, a second-mode second threshold, and a second-mode third threshold respectively corresponding to and respectively unequal to the first-mode first threshold, the first-mode second threshold, and the first-mode third threshold. The method may include the following steps: determining whether the display panel is defective using the (selected) one of the first-mode threshold set and the second-mode threshold set; and stopping an operation of at least one of the display panel, the gate driver, the data driver, and the power voltage generator when the display panel is determined to be defective.

The initial sensed signal value set may be values of sensed signals corresponding to a subset of the pixels of the display panel. The method may include the following steps: comparing an average of the values of the sensed signals corresponding to the subset of the pixels with a mode threshold; selecting the first-mode threshold set, so that a first threshold value, a second threshold value, and a third threshold value are equal to the first-mode first threshold, the first-mode second threshold, and the first-mode third threshold, respectively, when the average is equal to or greater than the mode threshold; and selecting the second-mode threshold set, so that the first threshold value, the second threshold value, and the third threshold value are equal to the second-mode first threshold, the second-mode second threshold, and the second-mode third threshold, respectively, when the average is less than the mode threshold.

The method may include the following step: when a difference between a present cycle sensed signal value of a pixel and a previous cycle sensed signal value of the pixel is equal to or greater than the first threshold value, determining the pixel to be a defective pixel candidate.

The method may include the following step: when a present cycle sensed signal value of the defective pixel candidate is equal to or greater than the second threshold value, determining the defective pixel candidate to be a defective pixel.

The method may include the following step: when a number of defective pixels determined based on the second threshold value is equal to or greater than the third threshold value, determining the display panel to be defective.

The method may include the following steps: determining whether the display panel has a history of being determined to be defective (and/or a history of a panel protection operation); when the display panel does not have a history of being determined to be defective (and/or a history of a panel protection operation), using the first-mode threshold set or the second-mode threshold set to determine whether the display panel is defective; and when the display panel has a history of being determined to be defective (and/or a history of a panel protection operation), using a third-mode threshold set (different from each of the first-mode threshold set and the second-mode threshold set) to determine whether the display panel is defective.

According to embodiments, the first mode operating at the high temperature and the second mode operating at the low temperature are determined based on the initial sensed signal value set. At least one of the first threshold value for determining the defective pixel candidates, the second threshold value for determining the defective pixels, and the third threshold value for determining whether the display panel is defective is set differently for the first mode and the second mode. Thus, unnecessary panel protection operations due to the change of the panel temperature may be prevented.

In embodiments, when a history of panel protection operation exists, the display apparatus may operate in a third mode in which a defective pixel is determined based on a present cycle sensed signal value without the step of comparing the present cycle sensed signal value with a previous cycle sensed signal value. Thus, a necessary panel protection operation may be quickly performed.

DETAILED DESCRIPTION

Examples of embodiments are described with reference to the accompanying drawings.

Although the terms "first," "second," etc. may be used to describe various elements, these elements should not be limited by these terms. These terms may be used to distinguish one element from another element. A first element may be termed a second element without departing from teachings of one or more embodiments. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

The term "connect" may mean "directly connect" or "indirectly connect." The term "connect" may mean "mechanically connect" and/or "electrically connect." The term "connected" may mean "electrically connected" or "electrically connected through no intervening transistor." The term "drive" may mean "control" and/or "operate." The term "driver" may mean "driver set" and/or "set of drivers." The term "compensate" may mean "adjust." The term "compensation" may mean "adjustment." The term "activate" may mean "provide." The term "operate" may mean "perform." The term "value" may mean "value set" or "set of values." The term "difference" may mean "difference set" or "set of differences." The term "different from" may mean "unequal to." The term "the same as" may mean "equal to." The term "sensed value" may mean "sensed signal value." The term "threshold value for the first/second/third mode" may mean "first/second/third-mode threshold (value)." The term "number" may mean "quantity."

Figure 1:
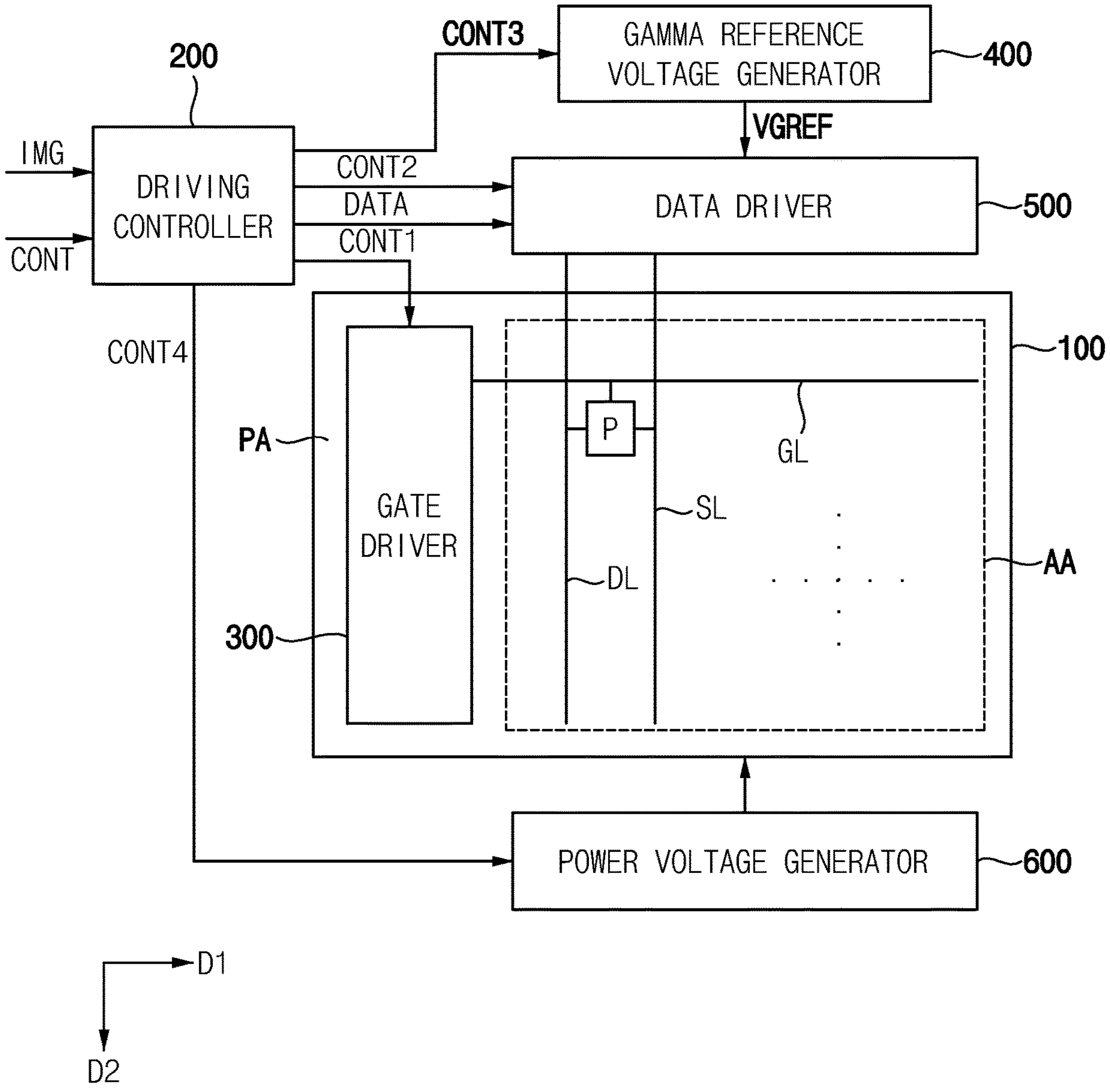
FIG. 1 is a block diagram illustrating a display apparatus according to an embodiment.

FIG. 1 is a block diagram illustrating a display apparatus according to an embodiment.

Referring to FIG. 1, the display apparatus includes a display panel 100 and a display panel driver. The display panel driver includes a driving controller 200, a gate driver 300, a gamma reference voltage generator 400, a data driver 500, and a power voltage generator 600.

The driving controller 200 and the data driver 500 may be integrally formed. The driving controller 200, the gamma reference voltage generator 400, and the data driver 500 may be integrally formed. A driving module including at least the driving controller 200 and the data driver 500 may be called to a timing controller embedded data driver (TED).

The display panel 100 has a display region AA for displaying an image and has a peripheral region PA adjacent to the display region AA.

The display panel 100 includes gate lines GL, data lines DL, and pixels P connected to the gate lines GL and the data lines DL. The gate lines GL extend in a first direction D1, and the data lines DL extend in a second direction D2 different from the first direction D1.

The display panel 100 may further include sensing lines SL connected to the pixels P. The sensing lines SL may extend in the second direction D2.

The display panel driver may include a sensing circuit receiving sensed signals from the pixels P of the display panel 100 through sensing lines SL. The sensing circuit may be disposed in the data driver 500. When the data driver 500 is a data driving integrated chip (IC), the sensing circuit may be implemented in the data driving IC. The sensing circuit may be separate from the data driver 500.

The driving controller 200 receives input image data IMG and an input control signal CONT from an external apparatus. The input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4, and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the power voltage generator 600 based on the input control signal CONT, and outputs the fourth control signal CONT4 to the power voltage generator 600.

The gate driver 300 generates gate signals in response to the first control signal CONT1 received from the driving controller 200. The gate driver 300 outputs the gate signals to the gate lines GL. The gate driver 300 may sequentially output the gate signals to the gate lines GL.

The gate driver 300 may be positioned in the peripheral region PA of the display panel 100. The gate driver 300 may be mounted on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

The gamma reference voltage generator 400 may be implemented in the driving controller 200 or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into analog data voltages using the gamma reference voltages VGREF. The data driver 500 outputs the data voltages to the data lines DL.

The data driver 500 may be positioned in the peripheral region PA of the display panel 100. The data driver 500 may be mounted on the peripheral region PA of the display panel 100.

The power voltage generator 600 may generate a power voltage for at least one of the display panel 100, the gate driver 300, and the data driver 500 based on the fourth control signal CONT4 received from the driving controller 200. The power voltage generator 600 may output the power voltage to at least one of the display panel 100, the gate driver 300, and the data driver 500.

Figure 2:
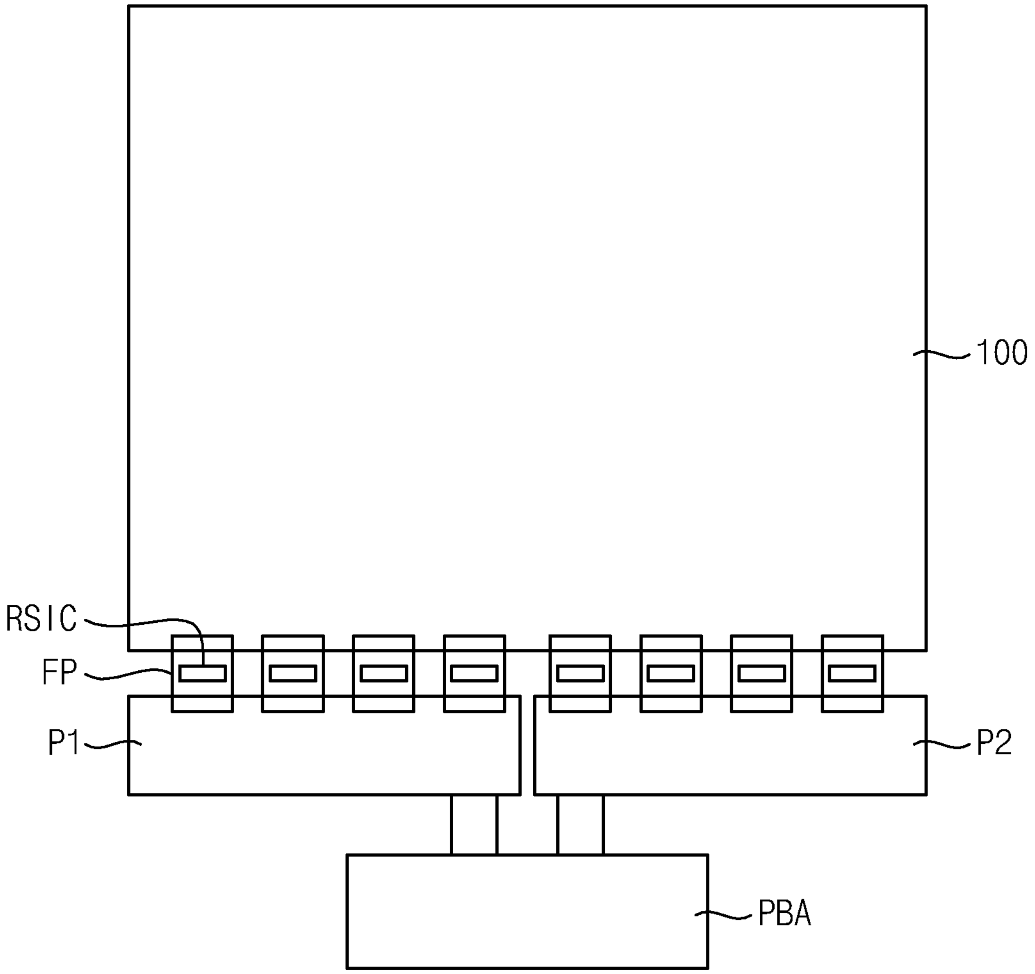
FIG. 2 is a plan view illustrating the display apparatus of FIG. 1 according to an embodiment.

FIG. 2 is a plan view illustrating the display apparatus of FIG. 1 according to an embodiment.

Referring to FIGS. 1 and 2, the display apparatus may include a printed circuit board assembly PBA, a first printed circuit P1 and a second printed circuit P2. The printed circuit board assembly PBA may be connected to the first printed circuit P1 and the second printed circuit P2. The driving controller 200 may be disposed on the printed circuit board assembly PBA. The power voltage generator 600 may be disposed on the printed circuit board assembly PBA.

The display apparatus may further include a plurality of flexible circuits FP connected to the first printed circuit P1 and the display panel 100. The display apparatus may further include another plurality of flexible circuits FP connected to the second printed circuit P2 and the display panel 100.

Readout chips RSIC of the data driver 500 may be disposed on the flexible circuits FP. A readout chip RSIC may be an integrated circuit chip. A sensing circuit may be disposed in readout chip RSIC. The readout chips RSIC may perform both outputting data voltages to the display panel 100 and receiving sensed signals from the display panel 100.

Figure 3:
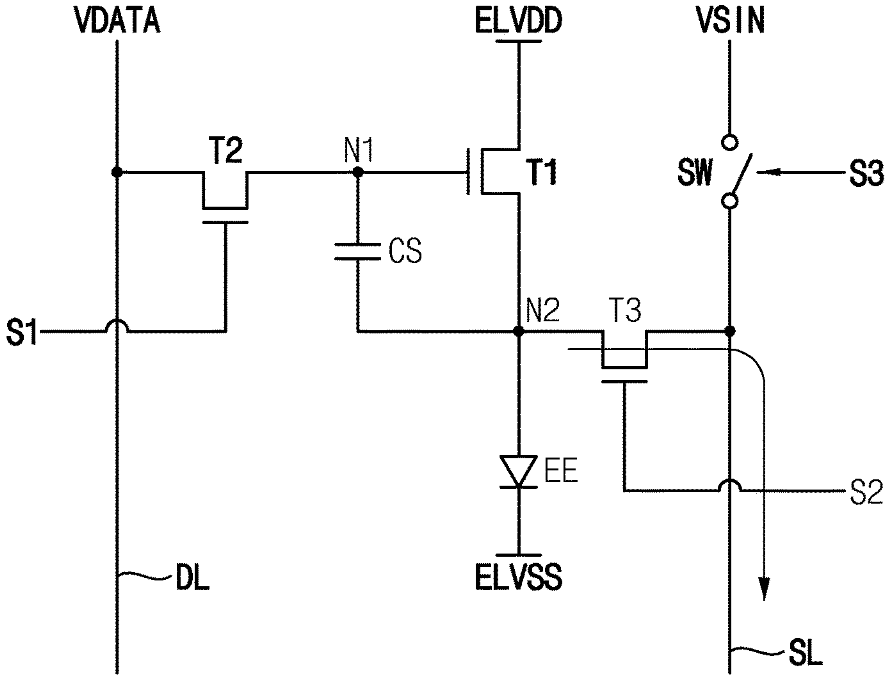
FIG. 3 is a circuit diagram illustrating a pixel of FIG. 1 according to an embodiment.
Figure 4:
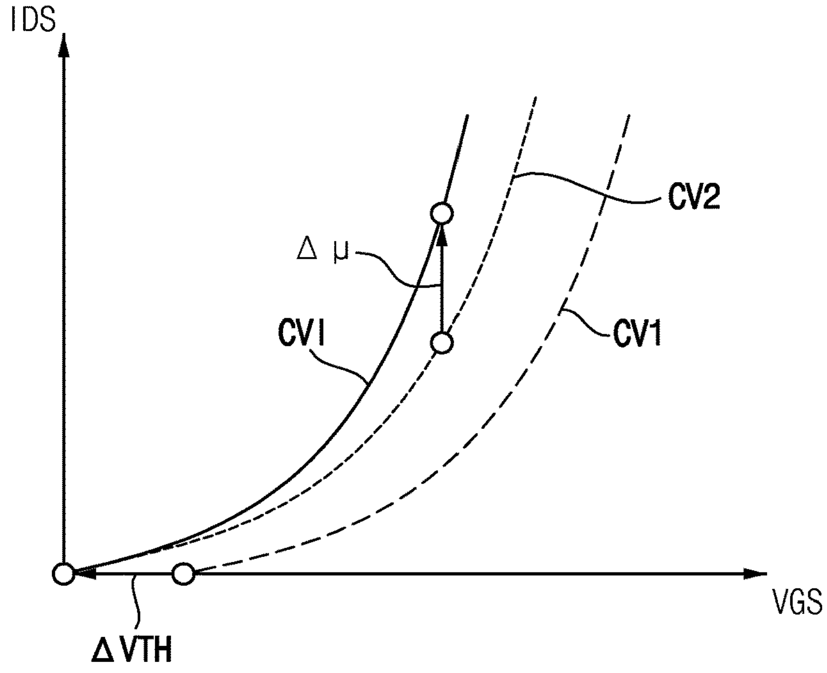
FIG. 4 is a graph illustrating a method of adjusting a threshold voltage and a mobility value of a first transistor of the pixel of FIG. 3 according to an embodiment.

FIG. 3 is a circuit diagram illustrating a pixel P of FIG. 1 according to an embodiment. FIG. 4 is a graph illustrating a method of adjusting a threshold voltage and a mobility value of a first transistor T1 of the pixel P of FIG. 3 according to an embodiment.

Referring to FIGS. 1 to 4, the pixel P may include a first transistor T1 for applying a first power voltage ELVDD to a second node N2 in response to a signal/voltage of a first node N1, a second transistor T2 for outputting the data voltage VDATA to the first node N1 in response to a first signal S1, a third transistor T3 for outputting a signal of the second node N2 to a sensing node in response to a second signal S2, a storage capacitor CS including a first electrode connected to the first node N1 and a second electrode connected to the second node N2, and a light emitting element EE including a first electrode connected to the second node N2 and a second electrode receiving a second power voltage ELVSS.

The second power voltage ELVSS may be less than the first power voltage ELVDD. The light emitting element may be an organic light emitting diode.

The pixel P may further include a sensing initialization switch SW for transmitting a sensing initialization voltage VSIN to the second node N2. The sensing initialization switch SW may be turned on and turned off based on a third signal S3.

The second signal S2 and the third signal S3 are activated (or provided) in a sensing initialization step so that the sensing initialization voltage VSIN may be applied to the second node N2.

In a sensing step, the third signal S3 is inactivated (or not provided), and the sensing circuit may receive a sensed current flowing through the second node N2 through the sensing line SL.

The sensing circuit may sense an electrical characteristic of the first transistor T1 through the sensed current. The electrical characteristic of the first transistor T1 may correspond to a mobility value μ of the first transistor T1. The electrical characteristic of the first transistor T1 may be a threshold voltage VTH of the first transistor T1.

The sensing circuit may sense an electrical characteristic of the light emitting element EE through the sensed current. The electrical characteristic of the light emitting element EE may be the capacitance between two electrodes of the light emitting element EE.

The data driver 500 may operate in a writing mode and in a sensing mode. In the writing mode, data voltages VDATA for displaying an image may be provided to the pixels P of the display panel 100. In the sensing mode, the threshold voltage of the first transistor T1 or the mobility of the first transistor T1 may be sensed for each pixel P. In the writing mode, the data driver 500 may output a data voltage VDATA corresponding to the grayscale value specified by the input image data IMG to the data line DL corresponding to a pixel P. In the sensing mode, the data driver 500 may output a sensing data voltage to sense the threshold voltage or the mobility of the first transistor T1 of the pixel P to the data line DL. In the sensing mode, the sensing circuit may determine the threshold voltage or the mobility of the first transistor T1 of the pixel P based on the sensed signal received through the sensing line SL.

The sensing mode may be operated in a power on period when the display apparatus starts to turn on, in a blank period between active periods when the image is displayed by the display panel 100, and/or in a power off period when the display apparatus starts to turn off.

The driving controller 200 may adjust the data applied to the pixel P according to the sensed threshold voltage and/or the mobility of the first transistor T1 of the pixel P and output the adjusted data to the data driver 500. The data driver 500 may output the data voltage (adjusted based on the sensed signal) to the data line DL.

The VGS in FIG. 4 represents a voltage between the first node N1 and the second node N2, which correspond to a gate electrode of the first transistor T1 and a source electrode of the first transistor T1, respectively. The IDS in FIG. 4 represents a current flowing through the first transistor T1. The CVI in FIG. 4 represents a V-I curve (a voltage-current curve) of an ideal pixel. The CV1 in FIG. 4 represents a V-I curve of a pixel before compensation (or adjustment). When the threshold voltage of the first transistor T1 is adjusted (by $\Delta$VTH) based on the sensed threshold voltage of the first transistor T1 in the curve CV1, the curve CV1 may be shifted to a curve CV2. When the mobility of the first transistor T1 is adjusted (by $\Delta\mu$) based on the sensed mobility of the first transistor T1 in the curve CV2, the curve CV2 may be shifted to the ideal curve CVI.

Figure 5:
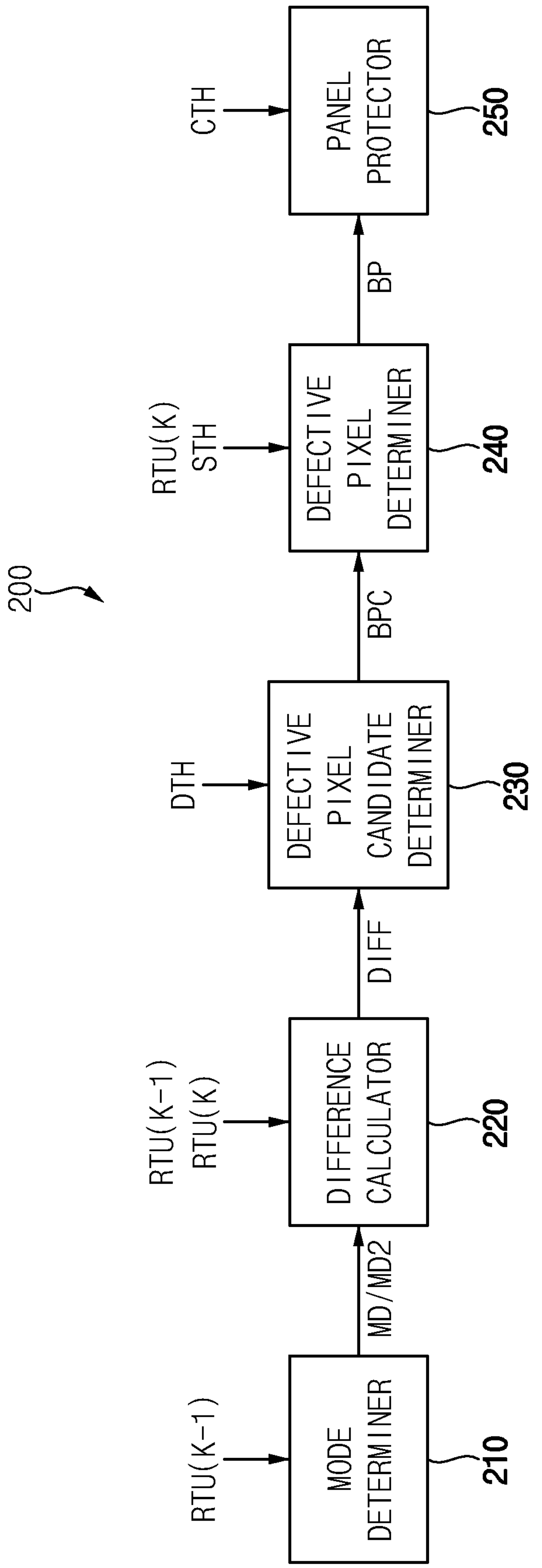
FIG. 5 is a block diagram illustrating a driving controller of FIG. 1 according to an embodiment.
Figure 6:
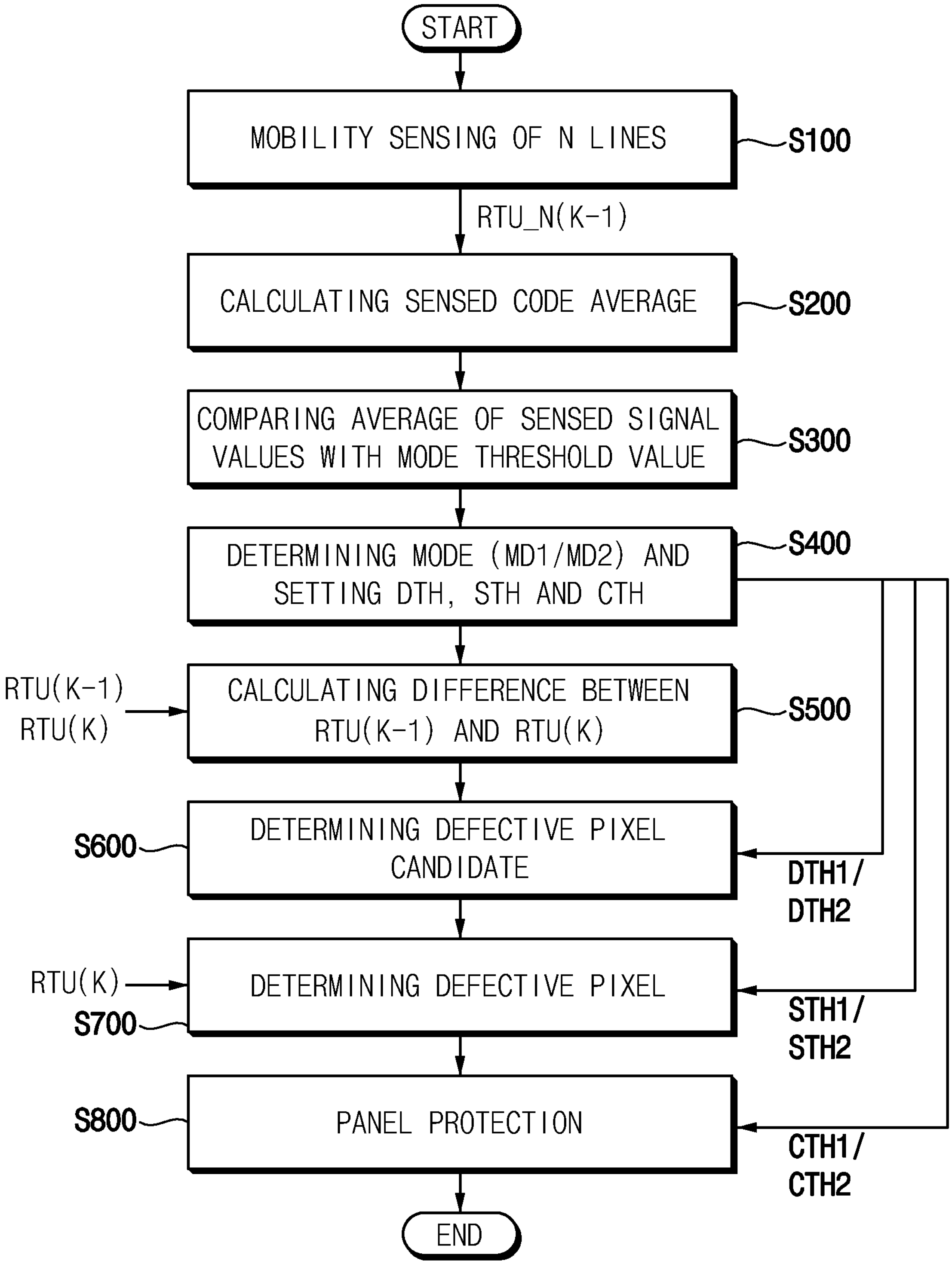
FIG. 6 is a flowchart illustrating an operation of the driving controller of FIG. 5 according to an embodiment.
Figure 7:
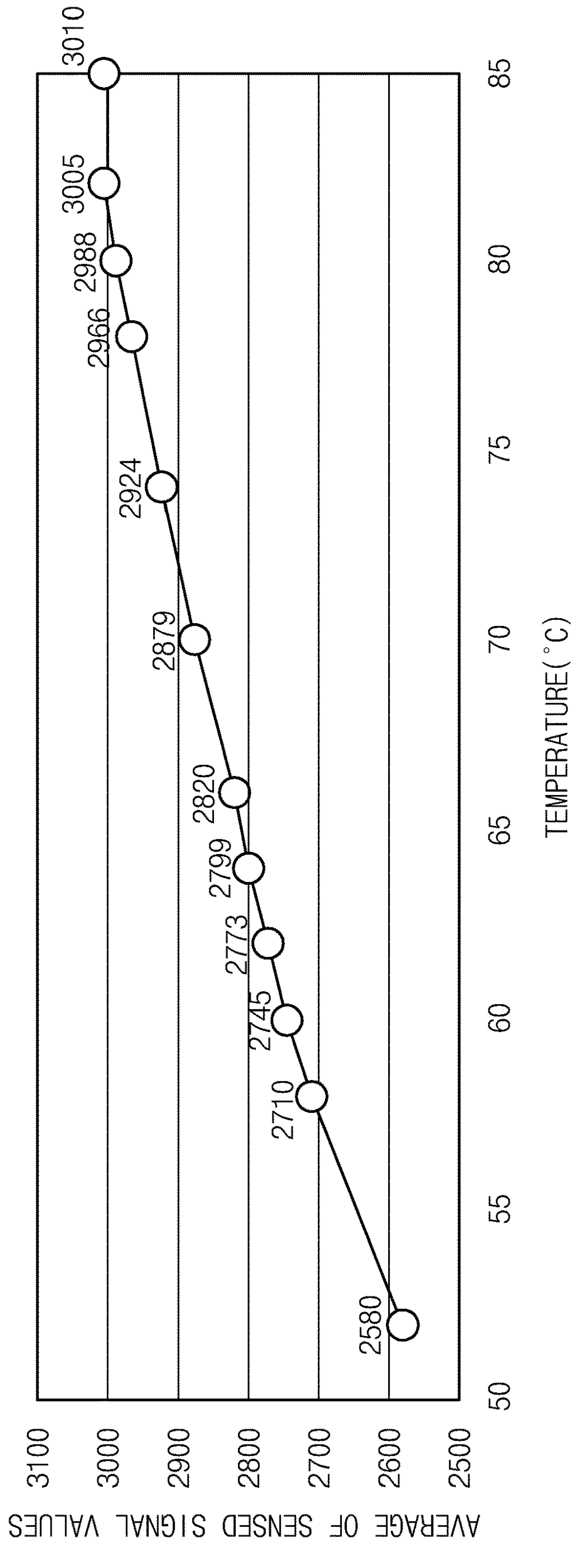
FIG. 7 is a graph illustrating an operation of mobility sensing of N lines (step S100) of FIG. 6 according to an embodiment.

FIG. 5 is a block diagram illustrating the driving controller 200 of FIG. 1 according to an embodiment. FIG. 6 is a flowchart illustrating an operation of the driving controller 200 of FIG. 5 according to an embodiment. FIG. 7 is a graph illustrating an operation of mobility sensing of N lines (step S100) of FIG. 6 according to an embodiment.

Referring to FIGS. 1 to 7, when the display panel 100 is determined to be a defective panel, the driving controller 200 may stop an operation of at least one of the display panel 100, the gate driver 300, the data driver 500, and the power voltage generator 600.

The driving controller 200 may determine a first mode MD1 and a second mode MD2 based on an initial sensed value RTU_N(K−1) or RTU(K−1). The driving controller 200 may set at least one of a first threshold value DTH, a second threshold value STH, and a third threshold value CTH for determining whether the display panel is defective differently for the first mode MD1 and the second mode MD2.

The initial sensed value RTU_N(K−1), or initial set of sensed values RTU_N(K−1), may include sensed values of the pixels corresponding to N gate lines. N may be a natural number. N may be less than a total number of the gate lines of the display panel 100 and may be equal to or greater than two.

The initial sensed value RTU(K−1), or initial set of sensed values RTU(K−1), may include sensed values of the pixels corresponding to all the gate lines of the display panel 100. An amount of time for obtaining the mobility sensed values of the pixels for all the gate lines may be referred to as one sensing cycle. The initial sensed value RTU(K−1) may include the mobility sensed values of the one sensing cycle.

When the initial sensed value RTU(K−1) for determining the modes include the mobility sensed values of the one sensing cycle, the accuracy of determination of the first mode MD1 and the second mode MD2 may be increased.

When the initial sensed value RTU_N(K−1) does not include the mobility sensed values of one sensing cycle but includes only the mobility sensed values of the pixels corresponding to the N gate lines (which are a part of all the gate lines of the display panel), the time for determination of the first mode MD1 and the second mode MD2 may be reduced.

A mode determiner 210 of the driving controller 200 may receive or determine the initial sensed value RTU_N(K−1) or RTU(K−1) through mobility sensing of N lines or mobility sensing of one sensing cycle (step S100).

The mode determiner 210 may calculate an average of the initial sensed value RTU_N(K−1) or RTU(K−1) (step S200).

The average and a mode threshold value may be compared (step S300), and the first mode MD1 and the second mode MD2 may be determined (step S400).

For example, when the average is equal to or greater than the mode threshold value, the driving controller 200 may operate in the first mode MD1. When the average is less than the mode threshold value, the driving controller 200 may operate in the second mode MD2.

The first mode MD1 may mean a high temperature mode in which an ambient temperature of the display panel 100 is high. The second mode MD2 may mean a low temperature mode in which the ambient temperature of the display panel 100 is low.

As shown in FIG. 7, when the ambient temperature of the display panel 100 increases, the average of the sensed values may increase. Thus, in a high temperature environment, the average may be relatively high. If the average exceeds a normal reference value in the high temperature environment, the panel protection operation may be erroneously performed even if the panel is not defective.

For avoiding erroneous panel protection operations, the mode determiner 210 may determine the high temperature mode MD1 and the low temperature mode MD2 based on the average of the initial sensed value RTU_N(K−1) or RTU(K−1).

The mode determiner 210 may set at least one of the first threshold value DTH, the second threshold value STH, and the third threshold value CTH for determining whether the display panel is defective differently for the first mode MD1 and the second mode MD2 (step S400).

A difference calculator 220 of the driving controller 200 may calculate a difference DIFF (or set of differences DIFF) between a present cycle sensed value RTU(K) of all the pixels and a previous cycle sensed value RTU(K−1) of all the pixels (step S500).

A defective pixel candidate determiner 230 may determine a pixel as a defective pixel candidate BPC when the difference between the present cycle sensed value of the pixel and the previous cycle sensed value of the pixel is equal to or greater than the first threshold value DTH (step S600).

When the difference DIFF between the present cycle sensed value of the pixel and the previous cycle sensed value of the pixel is great, it indicates that the sensed value of the pixel has significantly increased in the present cycle. When the sensed value of the pixel increases in a cycle, it indicates that the pixel may have a short circuit.

The first threshold value DTH1 for the first mode MD1 may be different from the first threshold value DTH2 for the second mode MD2.

The first threshold value DTH1 of the first mode MD1 may be greater than the first threshold value DTH2 of the second mode MD2. In the high temperature mode MD1, the sensed values are relatively great so that the first threshold value DTH1 for the high temperature mode MD1 may be set higher than the first threshold value DTH2 for the low temperature mode MD2.

A defective pixel determiner 240 of the driving controller 200 may determine the defective pixel candidate BPC as a defective pixel BP when the present cycle sensed value of the defective pixel candidate BPC is equal to or greater than the second threshold value STH (step S700).

The present cycle sensed value RTU(K) may represent the sensed values of all the pixels that are sensed in the present cycle. Each defective pixel candidate BPC having the sensed value equal to or greater than STH may be determined to be a defective pixel BP.

The second threshold value STH1 for the first mode MD1 may be different from the second threshold value STH2 for the second mode MD2.

The second threshold value STH1 for the first mode MD1 may be greater than the second threshold value STH2 for the second mode MD2. In the high temperature mode MD1, the sensed values are relatively great so that the second threshold value STH1 for the high temperature mode MD1 may be set higher than the second threshold value STH2 for the low temperature mode MD2.

When the number of the defective pixels BP is equal to or greater than the third threshold value CTH, a panel protector 250 may determine the display panel 100 to be a defective panel.

When the number of the defective pixels BP is very little, it may be determined that the noise or errors in some pixels and/or the defect of the display panel 100 is acceptable.

When the display panel 100 is determined to be a defective panel, the panel protector 250 may stop the operation of at least one of the display panel 100, the gate driver 300, the data driver 500, and the power voltage generator 600 (step S800).

The third threshold value CTH1 for the first mode MD1 may be different from the third threshold value CTH2 for the second mode MD2.

The third threshold value CTH1 for the first mode MD1 may be less than the third threshold value CTH2 for the second mode MD2. In the high temperature mode MD1, an operational stability of the display apparatus may be low. When several defective pixels BP are determined in the high temperature mode MD1, an urgent shutdown of the display apparatus may be required. Thus, the third threshold value CTH1 for the high temperature mode MD1 may be set less than the third threshold value CTH2 for the low temperature mode MD2.

Alternatively, the third threshold value CTH1 for the high temperature mode MD1 may be set same as the third threshold value CTH2 for the low temperature mode MD2.

When the difference between the present cycle sensed value of a pixel and the previous cycle sensed value of the pixel is less than the first threshold value DTH in the step S600, the process may return to the step S100, and the operation of the mode determiner 210 may restart. When the present cycle sensed value of a defective pixel candidate BPC is less than the second threshold value STH in the step S700, the process may return to the step S100, and the operation of the mode determiner 210 may restart. When the number of the defective pixels BP is less than the third threshold value CTH in the step S800, the process may return to the step S100, and the operation of the mode determiner 210 may restart.

According to embodiments, the first mode MD1 operating at the high temperature and the second mode MD2 operating at the low temperature are determined based on the initial sensed value(s) RTU_N(K−1) and/or RTU(K−1); at least one of the first threshold value DTH for determining the defective pixel candidates BPC, the second threshold value STH for determining the defective pixels BP, and the third threshold value CTH for determining the defective panel is set differently for the first mode MD1 and the second mode MD2. Thus, unnecessary panel protection operations due to the change of the panel temperature may be prevented.

Figure 8:
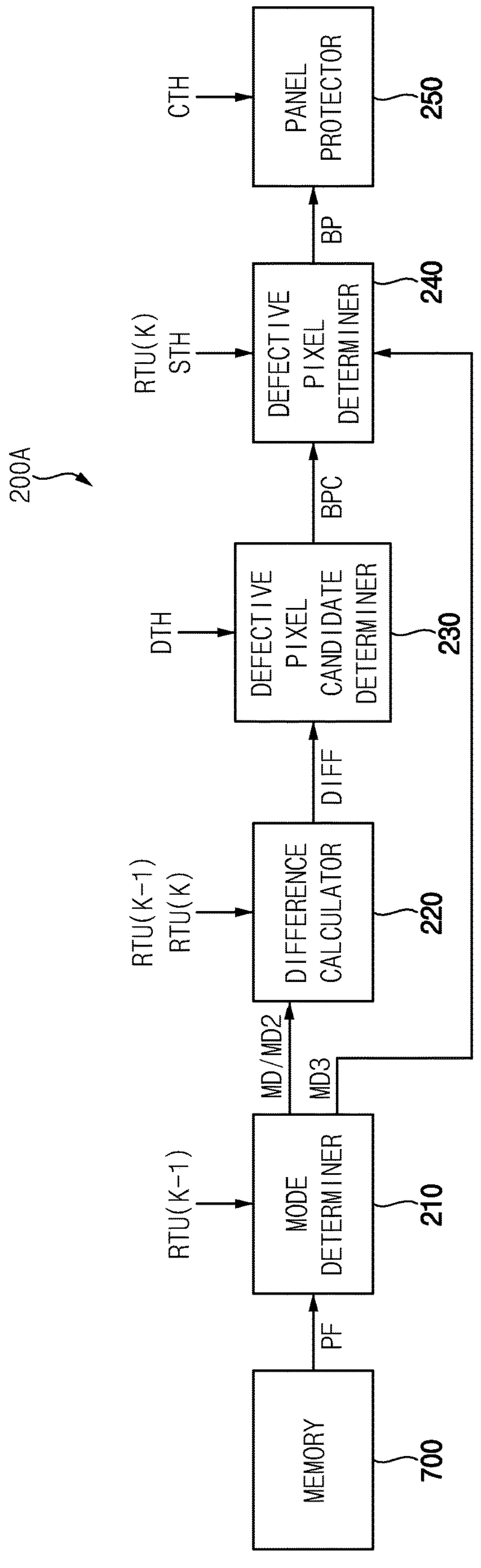
FIG. 8 is a block diagram illustrating a driving controller of a display apparatus according to an embodiment.
Figure 9:
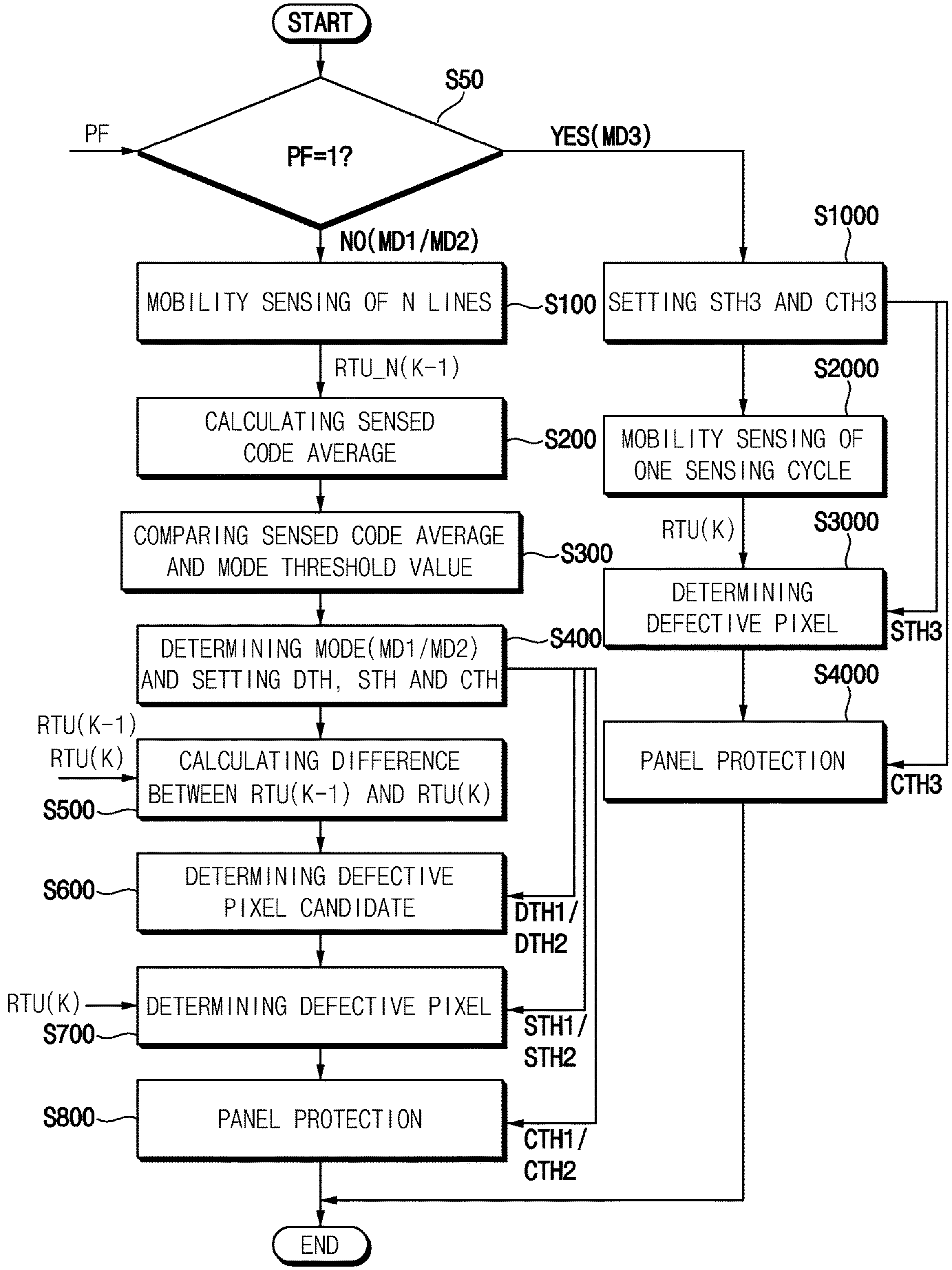
FIG. 9 is a flowchart illustrating an operation of the driving controller of FIG. 8 according to an embodiment.
Figure 10:
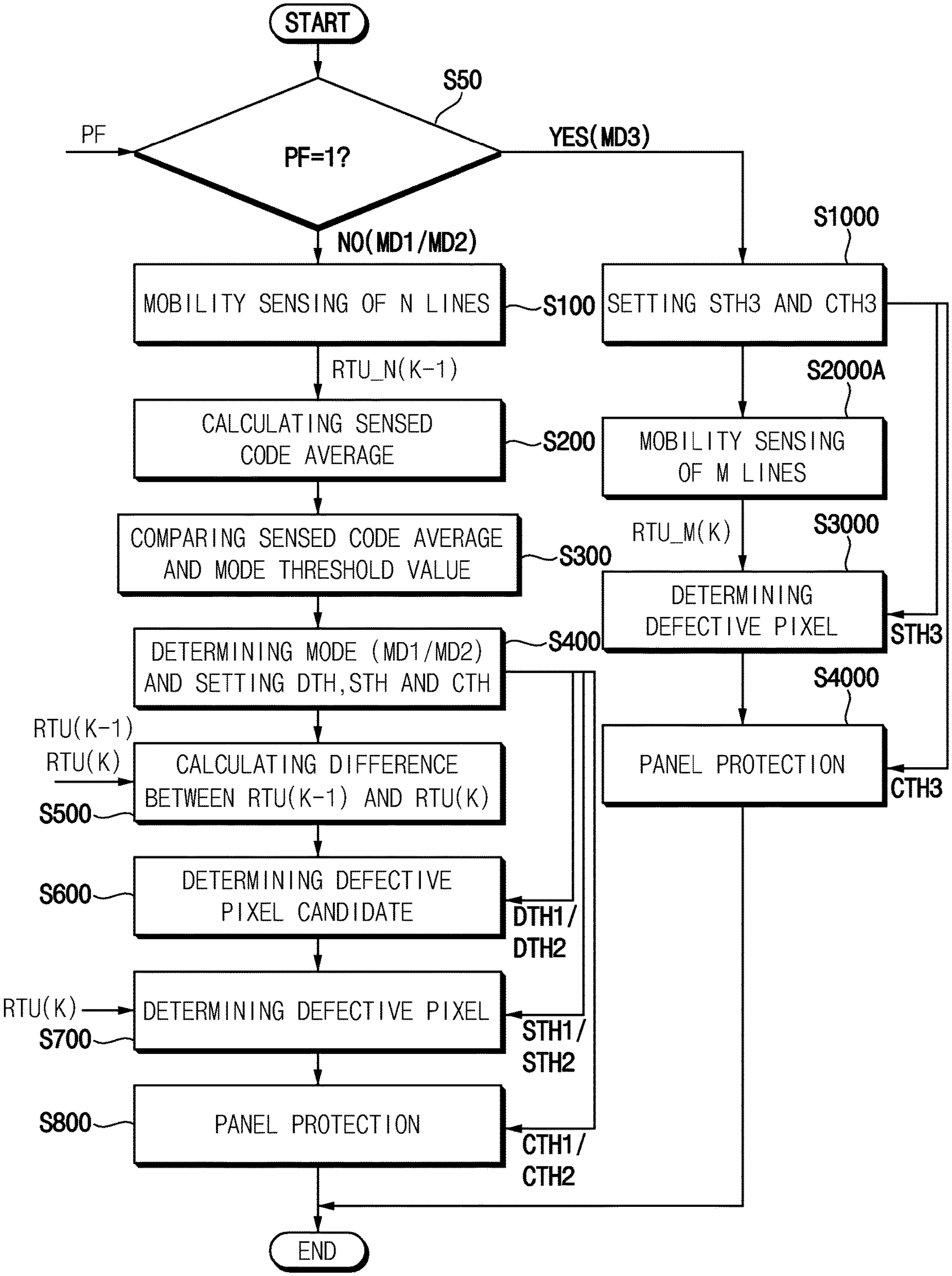
FIG. 10 is a flowchart illustrating an operation of the driving controller of FIG. 8 according to an embodiment.

FIG. 8 is a block diagram illustrating a driving controller 200A of a display apparatus according to an embodiment. FIG. 9 is a flowchart illustrating an operation of the driving controller 200A of FIG. 8 according to an embodiment. FIG. 10 is a flowchart illustrating an operation of the driving controller 200A of FIG. 8 according to an embodiment.

The display apparatus associated with FIGS. 8 to 10 may include features that are substantially the same as or analogous to features of the display apparatus described with reference to FIGS. 1 to 7.

Referring to FIGS. 1 to 4 and FIGS. 8 to 10, the display apparatus includes a display panel 100 and a display panel driver. The display panel driver includes a driving controller 200, a gate driver 300, a gamma reference voltage generator 400, a data driver 500, and a power voltage generator 600.

The display panel driver may include a sensing circuit for receiving sensed signals from the pixels P of the display panel 100 through sensing lines SL.

When the display panel 100 is determined to be a defective panel, the driving controller 200A may stop an operation of at least one of the display panel 100, the gate driver 300, the data driver 500, and the power voltage generator 600.

The driving controller 200A may receive a defect flag PF from a memory 700. The defect flag PF represents whether the display panel 100 has a history of being determined to be defective. When the display panel 100 has a history of being determined to be defective, the defect flag PF may have a value of one. When the display panel 100 does not have a history of being determined to be defective, the defect flag PF may have a value of zero. According to the defect flag PF, the mode determiner 210 determines at least one mode of operation (S50).

When/if the display panel 100 does not have a history of being determined to be defective (NO), the driving controller 200A may operate in one of the first mode MD1 and the second mode MD2. The operation of the display apparatus in the first mode MD1 and the second mode MD2 may be substantially the same as the operation of the display apparatus in the first mode MD1 and the second mode MD2 described with reference to one or more of FIGS. 1 to 7.

When/if the display panel 100 has a history being determined to be defective (YES), the driving controller 200A may operate in a third mode MD3.

When the display panel 100 has a history of being determined to be defective, the determination of whether the display panel 100 is defective panel may be performed faster than when the display panel 100 does not have a history of being determined to be defective.

In the third mode MD3, comparing the present cycle sensed value with the previous cycle sensed value and determining whether the difference between the present cycle sensed value and the previous cycle sensed value is equal to or greater than the first threshold value DTH (steps S500 and S600) may not be required.

In the third mode MD3, whether the panel is defective may be determined using the second threshold value STH3 and the third threshold value CTH3. The driving controller 200A may set the second threshold value STH3 and the third threshold value CTH3 in the third mode MD3 (step S1000).

Referring to FIG. 9, in the third mode MD3, the driving controller 200A may sense a sensed value set RTU(K) of pixels corresponding to all the gate lines of the display panel 100 (step S2000).

The driving controller 200A may determine whether the display panel 100 is defective or not based on the sensed value set RTU(K).

When/if the present cycle sensed value of a pixel is equal to or greater than the second threshold value STH3 for the third mode MD3, the driving controller 200A may determine the pixel to be a defective pixel BP (step S3000).

When the number of the defective pixels BP is equal to or greater than the third threshold value CTH3 for the third mode MD3, the driving controller 200A may determine the display panel 100 to be defective and may initiate the panel protection operation (step S4000).

Referring to FIG. 10, in the third mode MD3, the driving controller 200A may sense a sensed value set RTU_M(K) of pixels corresponding to M gate lines of the display panel 100 (step S2000A). M is an integer equal to or greater than two.

The driving controller 200A may determine whether the display panel 100 is defective or not based on the sensed value set RTU_M(K). The third mode MD3 may be an emergency mode in which the display panel 100 has a history of being shut down. Accordingly, in FIG. 10, whether the display panel 100 is defective may be more quickly determined based on the sensed value set RTU_M (K) of the pixels corresponding to only M gate lines, fewer than all the gate lines of the display panel 100.

When the present cycle sensed value of a pixel is equal to or greater than the second threshold value STH3 for the third mode MD3, the driving controller 200A may determine the pixel to be a defective pixel BP (step S3000).

When the number of the defective pixels BP is equal to or greater than the third threshold value CTH3 for the third mode MD3, the driving controller 200A may determine the display panel 100 to be defective (step S4000).

The third mode MD3 may be a mode for an emergency shutdown and an exceptional situation. Therefore, the second threshold value STH3 for the third mode MD3 may be set greater than the second threshold value STH2 for the second mode MD2, which is the low temperature mode.

The third mode MD3 may be the mode for an emergency shutdown. Therefore, the second threshold value STH3 for the third mode MD3 may be set same as the second threshold value STH1 for the first mode MD1, which is the high temperature mode.

The third mode MD3 may be the mode for an emergency shutdown and an exceptional situation. Therefore, the second threshold value STH3 for the third mode MD3 may be set greater than the second threshold value STH1 for the first mode MD1, which is the high temperature mode.

The third threshold value CTH3 for the third mode MD3 may be substantially the same as the third threshold value CTH1 for the first mode MD1. Alternatively, the third threshold value CTH3 for the third mode MD3 may be less than the third threshold value CTH1 for the first mode MD1. The third mode MD3 may be for an emergency shutdown; a risk of fire may be high in the third mode MD3. When several defective pixels BP are determined in the high temperature mode MD1, an urgent shutdown of the display apparatus may be required. Thus, the third threshold value CTH3 for the emergency shutdown mode MD3 may be set lower than the third threshold value CTH1 for the high temperature mode MD1.

According to embodiments, the first mode MD1 operating at the high temperature and the second mode MD2 operating at the low temperature are determined based on the initial sensed value set(s) RTU_N(K−1) and/or RTU(K−1); at least one of the first threshold value DTH for determining the defective pixel candidates BPC, the second threshold value STH for determining the defective pixels BP, and the third threshold value CTH for determining whether the display panel is defective is set differently for the first mode MD1 and the second mode MD2. Thus, unnecessary panel protection operations due to the change of the panel temperature may be prevented.

In embodiments, when a history of panel protection operations exists, the display apparatus may operate in the third mode MD3, in which the defective pixels are determined based on the present cycle sensed value set RTU(K) or RTU_M(K) without the step of comparing the present cycle sensed value set RTU(K) with the previous cycle sensed value set RTU(K−1). Thus, the panel protection operation may be quickly performed.

According to embodiments, the stability of the display apparatus may be satisfactory.

The foregoing is illustrative and is not to be construed as limiting. Although examples of embodiments have been described, many modifications are possible in the embodiments without materially departing from the scope as defined in the claims. In the claims, means-plus-function clauses may cover the structures described for performing the recited function and not only structural equivalents but also equivalent structures.

What is claimed is:

1. A display device comprising:

a display panel including pixels;

a gate driver configured to output gate signals to the pixels;

a data driver configured to output data voltages to the pixels;

a sensing circuit configured to receive sensed signals from the pixels;

a power voltage generator configured to apply a power voltage to at least one of the display panel, the gate driver, and the data driver; and a driving controller connected to at least one of the gate driver, the data driver and the power voltage generator, wherein the driving controller stops an operation of at least one of the display panel, the gate driver, the data driver, and the power voltage generator if the display panel is determined to be defective, wherein the driving controller selects one of a first-mode threshold set and a second-mode threshold set based on an initial sensed signal value set related to the sensed signals for determining whether the display panel is defective, wherein the first-mode threshold set includes a first-mode first threshold, a first-mode second threshold, and a first-mode third threshold, and wherein the second-mode threshold set includes a second-mode first threshold, a second-mode second threshold, and a second-mode third threshold respectively corresponding to and respectively unequal to the first-mode first threshold, the first-mode second threshold, and the first-mode third threshold.

2. The display apparatus of claim 1, wherein the initial sensed signal value set is values of sensed signals corresponding to a subset of the pixels, and wherein the subset of the pixels is electrically connected to a subset of gate lines of the display apparatus.

3. The display apparatus of claim 1, wherein the initial sensed signal value set is values corresponding to all the pixels of the display panel.

4. The display apparatus of claim 1, wherein the initial sensed signal value set is values of sensed signals corresponding to a subset of the pixels, wherein the driving controller compares an average of the values of the sensed signals corresponding to the subset of the pixels with a mode threshold, wherein when the average is equal to or greater than the mode threshold, the driving controller selects the first-mode threshold set, so that a first threshold value, a second threshold value, and a third threshold value are equal to the first-mode first threshold, the first-mode second threshold, and the first-mode third threshold, respectively, and wherein when the average is less than the mode threshold, the driving controller selects the second-mode threshold set, so that the first threshold value, the second threshold value, and the third threshold value are equal to the second-mode first threshold, the second-mode second threshold, and the second-mode third threshold, respectively.

5. The display apparatus of claim 4, wherein when a difference between a present cycle sensed signal value of a pixel among the pixels and a previous cycle sensed signal value of the pixel is equal to or greater than the first threshold value, the driving controller determines the pixel to be a defective pixel candidate.

6. The display apparatus of claim 5, wherein the first-mode first threshold is greater than the second-mode first threshold.

7. The display apparatus of claim 5, wherein when a present cycle sensed signal value of the defective pixel candidate is equal to or greater than the second threshold value, the driving controller determines the defective pixel candidate to be a defective pixel.

8. The display apparatus of claim 7, wherein the first-mode second threshold is greater than the second-mode second threshold.

9. The display apparatus of claim 7, wherein when a number of defective pixels of the display panel determined by the driving controller is equal to or greater than the third threshold value, the driving controller determines the display panel to be defective.

10. The display apparatus of claim 9, wherein the first-mode third threshold is less than the second-mode third threshold.

11. The display apparatus of claim 9, wherein the first-mode third threshold is equal to the second-mode third threshold.

12. The display apparatus of claim 1, wherein the driving controller receives a flag representing whether the display panel has a history of a panel protection operation, wherein when the flag indicates that the display panel does not have a history of a panel protection operation, the driving controller uses the first-mode threshold set or the second-mode threshold set to determine whether the display panel is defective, and wherein when the flag indicates that the display panel has a history of a panel protection operation, the driving controller uses a third-mode threshold set to determine whether the display panel is defective.

13. The display apparatus of claim 12, wherein the third-mode threshold set includes no third-mode first threshold corresponding to the second-mode first threshold and includes a third-mode second threshold and a third-mode third threshold respectively corresponding to and respectively unequal to the second-mode second threshold and the second-mode third threshold, and wherein when a present cycle sensed signal value of a pixel among the pixels is equal to or greater than the third-mode second threshold, the driving controller determines the pixel to be a defective pixel.

14. The display apparatus of claim 13, wherein when a number of defective pixels of the display panel determined by the driving controller is equal to or greater than the third-mode third threshold value, the driving controller determines the display panel to be defective.

15. The display apparatus of claim 14, wherein the third-mode second threshold is greater than the second-mode second threshold.

16. The display apparatus of claim 15, wherein the third-mode second threshold is equal to the first-mode second threshold.

17. The display apparatus of claim 15, wherein the third-mode second threshold is greater than the first-mode second threshold.

18. The display apparatus of claim 14, wherein the third-mode third threshold is equal to the first-mode third threshold.

19. The display apparatus of claim 14, wherein the third-mode third threshold is less than the first-mode third threshold.

20. The display apparatus of claim 14, wherein the driving controller determines whether the display panel is defective based on values corresponding to sensed signals of all of the pixels of the display panel when the flag indicates that the display panel has a history of a panel protection operation.

21. The display apparatus of claim 14, wherein the driving controller determines whether the display panel is defective based on values corresponding to sensed signals of a subset of the pixels of the display panel when the flag indicates that the display panel has a history of a panel protection operation.

22. A method of operating a display apparatus, the display apparatus comprising a display panel, a gate driver, a data driver, and a power voltage generator, the method comprising:

receiving sensed signals from pixels of the display panel;

selecting one of a first-mode threshold set and a second-mode threshold set based on an initial sensed signal value set related to the sensed signals, wherein the first-mode threshold set includes a first-mode first threshold value, a first-mode second threshold value, and a first-mode third threshold value, and wherein the second-mode threshold set includes a second-mode first threshold, a second-mode second threshold, and a second-mode third threshold respectively corresponding to and respectively unequal to the first-mode first threshold, the first-mode second threshold, and the first-mode third threshold;

determining whether the display panel is defective using the one of the first-mode threshold set and the second-mode threshold set; and stopping an operation of at least one of the display panel, the gate driver, the data driver, and the power voltage generator when the display panel is determined to be defective.

23. The method of claim 22, wherein the initial sensed signal value set is values of sensed signals corresponding to a subset of the pixels of the display panel, wherein the method comprises:

comparing an average of the values of the sensed signals corresponding to the subset of the pixels with a mode threshold;

selecting the first-mode threshold set, so that a first threshold value, a second threshold value, and a third threshold value are equal to the first-mode first threshold, the first-mode second threshold, and the first-mode third threshold, respectively, when the average is equal to or greater than the mode threshold; and selecting the second-mode threshold set, so that the first threshold value, the second threshold value, and the third threshold value are equal to the second-mode first threshold, the second-mode second threshold, and the second-mode third threshold, respectively, when the average is less than the mode threshold.

24. The method of claim 23, comprising:

when a difference between a present cycle sensed signal value of a pixel and a previous cycle sensed signal value of the pixel is equal to or greater than the first threshold value, determining the pixel to be a defective pixel candidate.

25. The method of claim 24, comprising:

when a present cycle sensed signal value of the defective pixel candidate is equal to or greater than the second threshold value, determining the defective pixel candidate to be a defective pixel.

26. The method of claim 25, comprising:

when a number of defective pixels determined based on the second threshold value is equal to or greater than the third threshold value, determining the display panel to be defective.

27. The method of claim 22, comprising:

determining whether the display panel has a history of a panel protection operation;

when the display panel does not have a history of a panel protection operation, using the first-mode threshold set or the second-mode threshold set to determine whether the display panel is defective; and when the display panel has a history of a panel protection operation, using a third-mode threshold set different from each of the first-mode threshold set and the second-mode threshold set to determine whether the display panel is defective.

* * * * *